US006735503B2

(12) United States Patent
Ames

(10) Patent No.: US 6,735,503 B2
(45) Date of Patent: May 11, 2004

(54) AUTOMATED VOICE RESPONSE TO DELIVER REMOTE VEHICLE DIAGNOSTIC SERVICE

(75) Inventor: Michael B. Ames, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 238 days.

(21) Appl. No.: 10/001,107

(22) Filed: Nov. 2, 2001

(65) Prior Publication Data

US 2003/0088347 A1 May 8, 2003

(51) Int. Cl.[7] .............................................. G01M 17/00
(52) U.S. Cl. .............................. 701/29; 701/33; 701/32
(58) Field of Search .............................. 701/29, 30, 31, 701/33, 34, 32

(56) References Cited

U.S. PATENT DOCUMENTS 6,028,537 A * 2/2000 Suman et al. ............... 340/988
6,330,499 B1 12/2001 Chou et al.
6,604,033 B1 8/2003 Banet et al.
6,611,740 B2 8/2003 Lowrey et al.
2002/0133273 A1 * 9/2002 Lowrey et al. ............... 701/29

* cited by examiner

*Primary Examiner*—Yonel Beaulieu
(74) *Attorney, Agent, or Firm*—Anthony Luke Simon

(57) ABSTRACT

A method for remotely diagnosing a vehicle includes the steps of receiving a vehicle diagnostic request, retrieving at least one diagnostic code from the vehicle, filtering the at least one diagnostic code based on at least one usability factor and sending a preset diagnostic response associated with the filtered diagnostic code to the vehicle. A system for remotely diagnosing a vehicle comprises means for receiving a vehicle diagnostic request, means for retrieving at least one diagnostic code from the vehicle, means for filtering the at least one diagnostic code based on at least one usability factor and means for sending a preset diagnosis response associated with the filtered diagnostic code to the vehicle.

24 Claims, 5 Drawing Sheets

200

AUTOMATED VOICE RESPONSE TO DELIVER REMOTE VEHICLE DIAGNOSTIC SERVICE

FIELD OF THE INVENTION

This invention relates generally to delivering services, such as subscriber-requested services, in a vehicle such as an automobile. In particular this invention relates to a method and system for providing automated voice response to deliver remote vehicle diagnostic service.

BACKGROUND OF THE INVENTION

Current methods of system diagnostic services in a vehicle, such as an automobile, are centered on an in-vehicle approach. To facilitate this approach, some methods use in-vehicle hardware configurations or enablers such as onboard computers. Other methods use in-vehicle hardware and software configurations and enablers such as onboard databases of in-vehicle services. These subsystems are used to interpret the vehicle diagnostic codes. These subsystems, however do not provide the full system diagnostic. New codes are not updated on these systems, and codes may become out of date. Codes that provide little or no value to the user are not filtered out and no directions or assistance is given on how to remedy the system code.

Yet other methods provide remote analysis and communication with the vehicle and its diagnostic system using a live advisor. This remote method, however, may require an extended period of connection between the vehicle and the live advisor. It may be very expensive to wait for the advisor to manually sort through the codes, decide which codes are useful for the user, and figure out what steps the user should take. The advisor, oftentimes, does not necessarily know what steps to take to solve the problem. Furthermore, every advisor may give different non-standardized advice depending on the amount of knowledge he possesses. Moreover, as new codes are developed they cannot be updated in the vehicle. Therefore, it would be desirable to provide a method for a remote vehicle diagnostic service that overcomes the above difficulties.

SUMMARY OF THE INVENTION

A method for remotely diagnosing a vehicle is provided. A vehicle diagnostic request is received. At least one diagnostic code is retrieved from the vehicle. The at least one diagnostic code is filtered based on at least one usability factor. A preset diagnostic response associated with the filtered diagnostic code is sent to the vehicle.

The preset diagnostic response may be an associated voice response. The usability factor may be determined based on a user location, a vehicle code complexity, and a severity factor. Receiving the vehicle diagnostic request may comprise receiving a voice request at a service management application, the voice request being associated by a speech recognition system to a check diagnostic command. The vehicle diagnostic request may be authenticated. The at least one vehicle diagnostic code may be stored at a service management application on a remote server. The user may be transferred to a live representative in response to a user reply to a satisfaction inquiry. Vehicle diagnostic codes may be updated. Updating the vehicle diagnostic codes may comprise downloading the vehicle diagnostic codes to an in-vehicle diagnostic computer.

A system for remotely diagnosing a vehicle is also provided. The system includes means for receiving a vehicle diagnostic request. The system also includes means for determining whether at least one diagnostic code is present at the vehicle. The system also includes means for retrieving the at least one diagnostic code from the vehicle. The system also includes means for filtering the present diagnostic code based on at least one usability factor. The system also includes means for sending a preset diagnostic response associated with the filtered diagnostic code to the vehicle.

The system may also include means for determining the usability factor based on a user location, a vehicle code complexity and a severity factor. The system may also include means for authenticating the vehicle diagnostic request. The system may also include means for storing the at least one vehicle diagnostic code at a service management application on a remote server. The system may also include means for transferring to a live representative in response to a user reply to a satisfaction inquiry. The system may also include means for updating vehicle diagnostic codes.

A computer usable medium including a program for remotely diagnosing a vehicle is also provided. The medium includes computer readable program code that receives a vehicle diagnostic request. The medium also includes computer readable program code that determines whether at least one diagnostic code is present at the vehicle. The medium also includes computer readable program code that retrieves the at least one diagnostic code from the vehicle. The medium also includes computer readable program code that filters the present diagnostic code based on at least one usability factor. The medium also includes computer readable program code that sends a preset diagnostic response associated with the filtered diagnostic code to the vehicle.

The medium may include computer readable program code wherein the preset diagnostic response is an associated voice response. The medium may include computer readable program code that determines the usability factor based on a user location, a vehicle code complexity, and a severity factor. The vehicle diagnostic request may comprise a voice request, which may be connected by a speech recognition system to a check diagnostic code command. The medium may also include computer readable program code that authenticates the vehicle diagnostic request. The medium may also include computer readable program code that stores the at least one vehicle diagnostic code at a service management application on a remote server. The medium may also include computer readable program code that transfers to a live representative in response to a user reply to a satisfaction inquiry. The medium may also include computer readable program code that updates the vehicle diagnostic codes. Updating the vehicle diagnostic codes may comprise downloading the vehicle diagnostic codes to an in-vehicle diagnostic computer.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
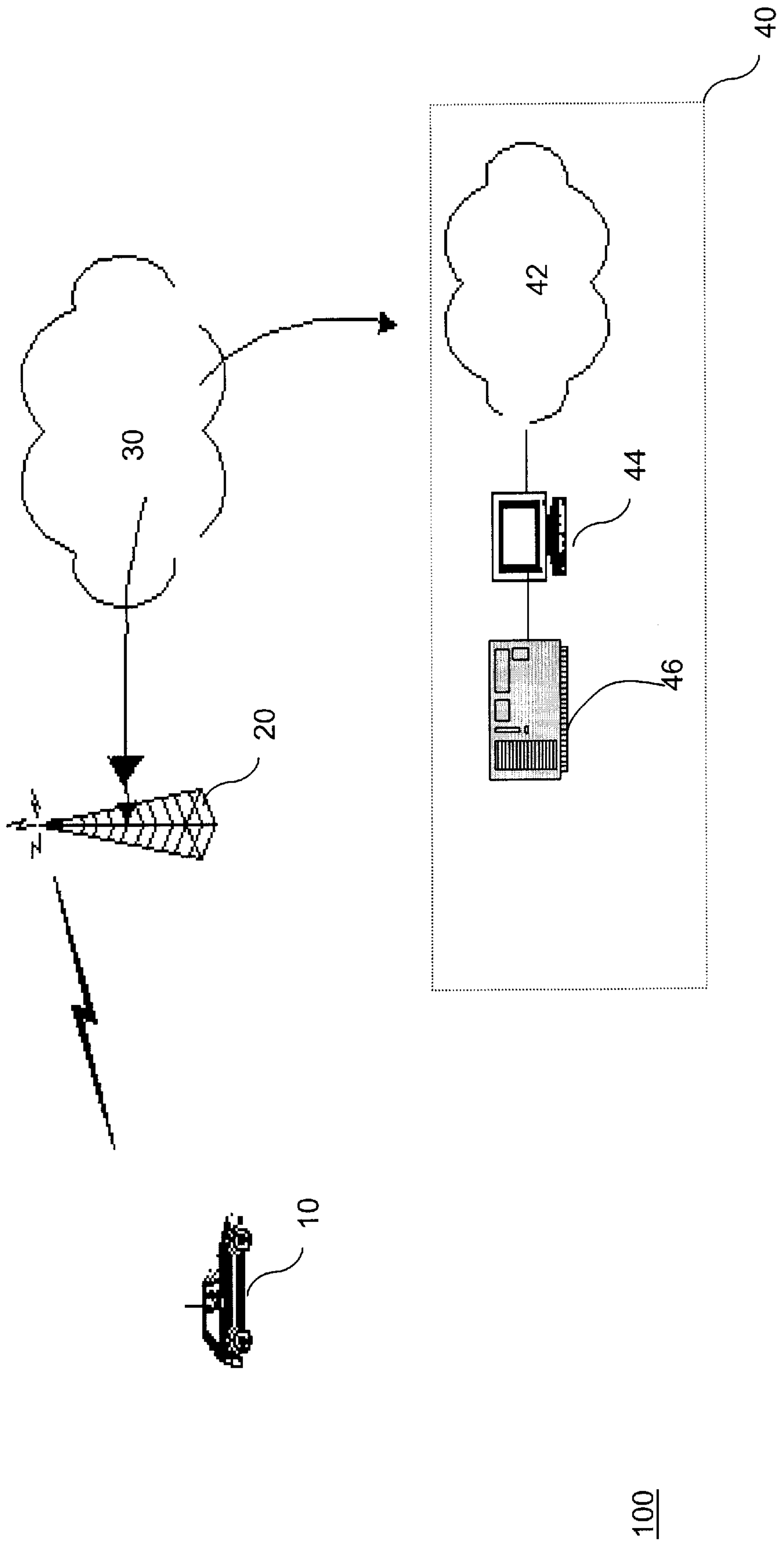
FIG. 1 is a schematic diagram of one embodiment of a system for providing automated voice response to deliver remote vehicle diagnostic service.

FIG. 1 shows a schematic diagram of one embodiment of a system for providing automated voice response to deliver remote vehicle diagnostic service in accordance with the present invention at numeral 100. The system 100 may include one or more vehicle clients 10, one or more carrier systems 20, one or more communication networks 30, and one or more service management subsystems 40. The service management subsystem may comprise one or more service management applications 42, one or more speech recognition systems 46, and one or more managers 44.

Vehicle client 10 may be any suitable vehicle. For example, the vehicle may be an automobile or a passenger-carrying unit such as a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 may be any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system 20 may be a separate transmitter/receiver carried by vehicle client 10.

Communication network 30 is any suitable system for communicating between vehicle client 10 and service management subsystem 40. In one embodiment of the invention, communication network is a public switched telephone network (PSTN). Alternatively, communication network 30 may be a multiprotocol Internet or intranet capable of transmitting voice and/or data in either analog or digital form or a combination of both.

Service management subsystem 40 is a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. Both services may be necessary for diagnostic inquiries. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent, web channel, speech channel) and of the service. In one embodiment of the invention, service management subsystem comprises one or more application components 42, one or more voice recognition systems 46, and one or more service managers 44. For example, application 42 may be any suitable software application for managing one or more services. Voice recognition system 46 may be any suitable voice recognition system for associating human speech characteristics with computer code and commands. Service managers 44 may be any suitable hardware and/or software configuration or structure for executing applications 42.

Figure 2:
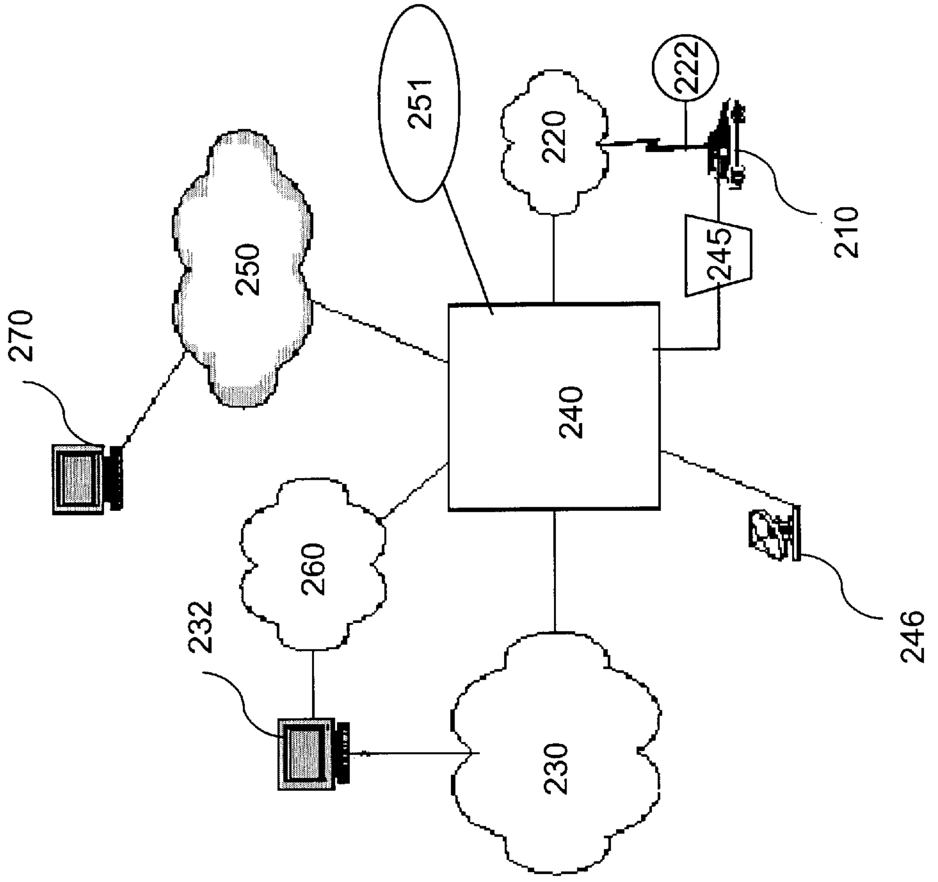
FIG. 2 is a schematic diagram of one embodiment of a system for providing automated voice response to deliver remote vehicle diagnostic service.

FIG. 2 shows one embodiment of a system for providing automated voice response to deliver remote vehicle diagnostic service to a vehicle in accordance with the present invention at 200. Vehicle-directed service system 200 may include a subscriber 210 and a service management subsystem 240. In the embodiment shown in FIG. 2, the service management subsystem may be in connection with a communication network 230, such as a voice or data channel. Service management subsystem 240 may also be in communication with service applications or other service management subsystems. For example, in FIG. 2, service management subsystem 240 is also in communication with a subsystem for managing subscribers shown at 250. Service management subsystem 240 may also be in communication with a web-based service application or other web-based service management systems or web servers. For example, in FIG. 2, service management application 240 is in communication with a web channel 260.

In one embodiment of the invention, service management application may include an in-vehicle component 245. This in-vehicle component may be located in or on the vehicle, or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a diagnostic service. For example, when the subscriber 210 believes something to be wrong with the vehicle, subscriber 210 may select to access the diagnostic service by using voice commands in a conversational manner. The subscriber 210 may then be in contact with the service management application 240 until the vehicle diagnostic program provides the subscriber information on the problem in the vehicle. The vehicle subscriber 210 may choose to access a live advisor 270 if the information provided by the service management application 240 is insufficient. Furthermore, the vehicle subscriber 210 may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. In one embodiment of the invention, subscribers connect to the service management application 240 through the Internet 230 using standard Web browsers.

Subscriber 210 may also have GUI access through a web channel 260. This interface may be used by subscribers to access a variety of services. For example, subscriber 210 may maintain one or more user profiles using web channel 260. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscriber 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240. A satellite feed 246 may serve as a backup mechanism.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

Figure 3:
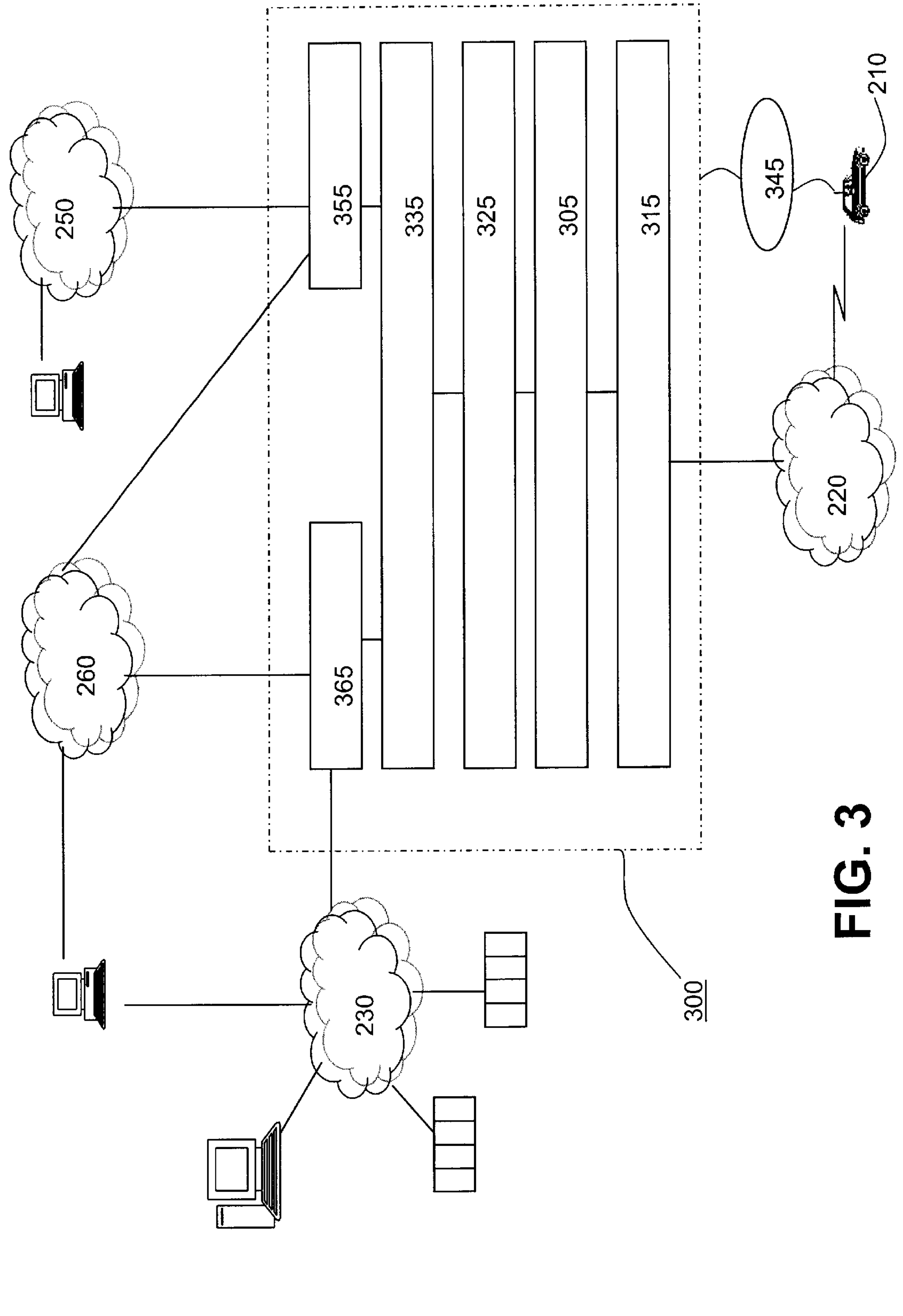
FIG. 3 is a schematic diagram of one embodiment of a service management subsystem for providing services in a vehicle in accordance with the present invention.

FIG. 3 shows one embodiment of a subsystem for providing automated voice response to deliver remote vehicle diagnostic service to a vehicle in accordance with the present invention at 300. This subsystem 300 may be used, for example, within system 200 as described above. In one embodiment of the invention, this subsystem 300 is used to interface with a public switched telephone network such as PSTN 220. For example, subsystem 300 may connect to PSTN 220 to communicate with subscriber 210 and vehicle. Subsystem 300 may also connect to subscriber management system 250. Subsystem 300 may use subscriber management system 250 to validate a connection and to retrieve associated subscriber information.

In one embodiment of the invention, subsystem 300 may include an in-vehicle speech recognition component 345. Speech recognition component may be located in or on vehicle 210 and may be used to access components of system 200. For example, subscriber 210 may gain audio access to subscriber management application 250 by activating speech recognition component 345. Speech recognition component 345 may be, for example, any suitable speech recognition application as is known in the art. Speech recognition application 345 may allow the subscriber 210 to place hands-free cell phone calls. In one embodiment of the invention, the in-vehicle system 345 installs a software algorithm, based on the type of call originated through a voice command, in order to optimize the talk path to subscriber management application 250. Speech recognition component 345 may also allow the subscriber 210 to connect to a live administrator or advisor through a spoken command acknowledged through the subscriber management application 250 VUI.

Subsystem 300 may include a front-end telephony component 315. Front-end telephony component may be any suitable telephony hardware or software for enabling service management application 240 to communicate with public telephone network 220. This may be, for example, a conventional analog or digital transceiver. Front-end telephony component 315 may also connect to the PSTN 220 for communication with subscriber 210 and/or the subscriber's vehicle. Front-end telephony component 315 may also connect to subscriber management system 250 for such services as connection validation and retrieval of associated subscriber information.

Front-end telephony component 315 may also connect to front-end speech-enabled/multimedia subsystem 305. In one embodiment of the invention, multimedia subsystem 305 comprises a plurality of telephony services. Speech-enabled multimedia subsystem 305 may, for example, enable VUI functions. Speech-enabled multimedia subsystem 305 may also handle VUI of service management application 240. Speech-enabled multimedia subsystem 305 may also connect to PSTN 220 to handle audio communications with subscribers 210 in their vehicles.

Speech-enabled multimedia subsystem 305 may be connected to script server and middle layer components 325. Speech-enabled multimedia subsystem 305 may be used to control the dialogs of script server and middle layer components 325. Script server and middle layer components 325 may be used to handle the actual dialog with the subscriber 210. The script server may interpret the dialog rules implemented in scripts. In one embodiment of the invention, the speech-enabled multimedia subsystem 305 converts dialog instructions into audio output for the subscriber 210 and interprets the subscriber's audio response for script server and middle layer components 325.

System 300 may also include a communications mechanism 335. Communications mechanism 335 may be any suitable communications hardware or software that provides a remote procedure call-like paradigm. Communications mechanism 335 may be based, for example, on socket-level communications. Communications mechanism 335 may also provide a basic load balancing capability.

System 300 may also include back end content service 365. This content service 365 may be any suitable content service, such as content servers or vehicle diagnostic information. Content services 365 may present interfaces to other components of system 200, 300, including web server 260, script server and middle layer components 325 and Internet 230. Script server and middle layer components 325 may also access data content from content services 365.

System 300 may also include back end infrastructure services 355. Infrastructure services 355 may be any suitable hardware components or software applications that provide infrastructure and administrative support to the content service 365 and to script server and middle layer components 325. Infrastructure services 355 may also provide the facilities for administrators 270 to define such information as content categories and default user profiles for system 200. Infrastructure services 355 may also be used by subscribers 210 to define and maintain their own profiles. Script server and middle layer components 325 may also use infrastructure services 355 for infrastructure support.

Figure 4:
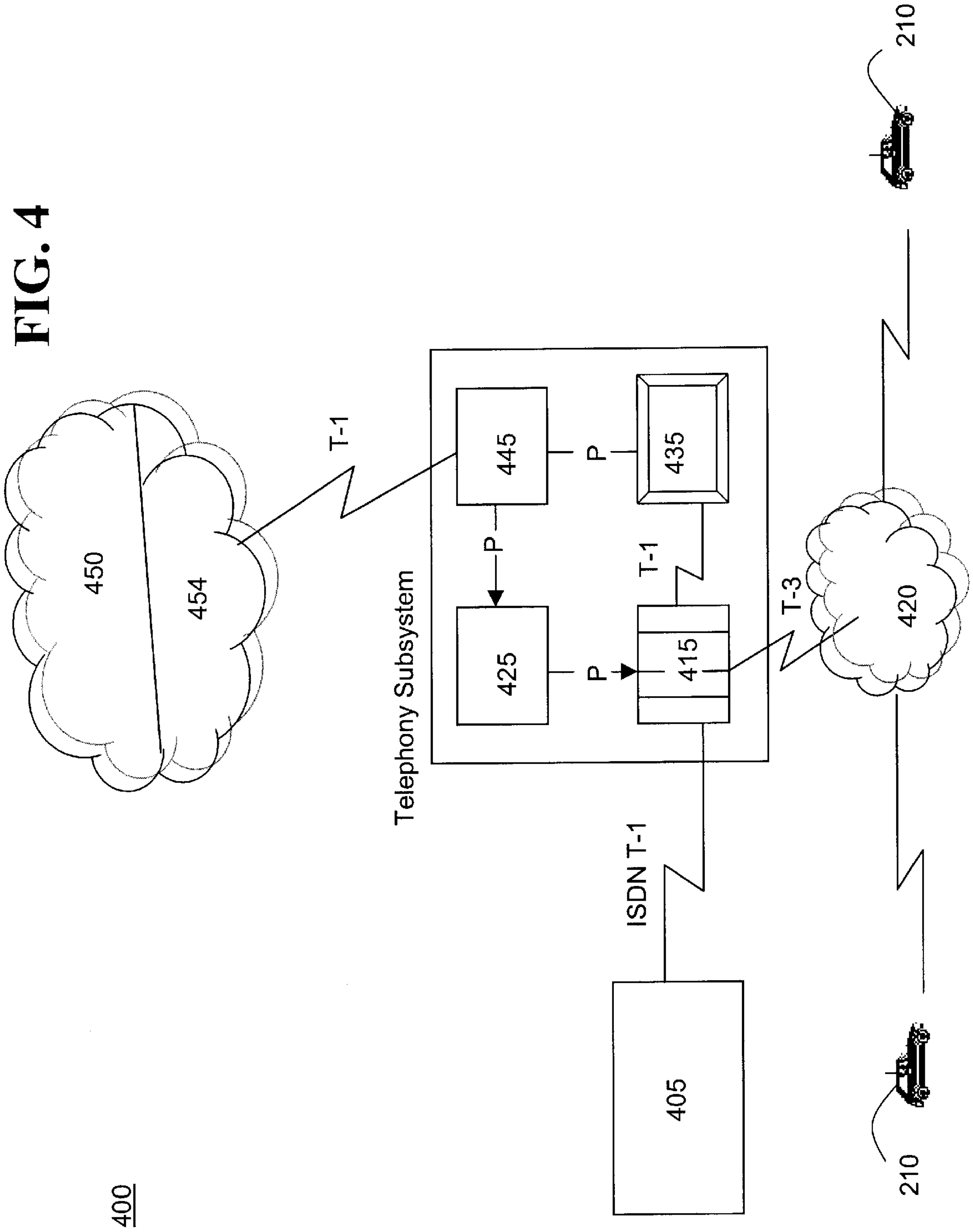
FIG. 4 is a schematic diagram of one embodiment of a communication subsystem for providing automated voice response to deliver remote vehicle diagnostic service.

FIG. 4 shows one embodiment of a communication subsystem for providing automated voice response to deliver remote vehicle diagnostic service to a vehicle in accordance with the present invention at 400. For example, the role of the subsystem 400 may be to handle a call from subscriber 210 into system 200 described above. In the embodiment of FIG. 4, the communication subsystem 400 is a telephony subsystem.

In one embodiment of the invention, telephony subsystem 400 may be used to establish and maintain a communications circuit between PSTN 420 and a Voice User Interface (VUI) Subsystem 405. VUI subsystem 405 may be used to enable the dialog between the subscriber and the service management subsystem 40 described above. VUI subsystem 405 of communication subsystem 400 may be, for example, any suitable hardware and/or software interface to handle speech recognition and speech generation functions.

Subsystem 400 may have an external interface 420. In the embodiment of FIG. 4, this interface is a PSTN. The interface may be, for example, a high capacity connection (such as, for example, a T-3 connection) to a public phone system through which calls are placed. Calls from subscribers in their vehicles may originate by dialing a dedicated phone number that is terminated on a network-based call distribution mechanism or directly on a local switching system.

Communication subsystem 400 may also provide interfaces to other service management subsystem components. For example, communication subsystem 400 may communicate with a subscriber management subsystem 450. Subscriber management subsystem 450 may be, for example, a Wide Area Network interface to a Call Center system. Subscriber management subsystem 450 may be used to fetch subscriber information. For example, subscriber information may be stored as data in a suitable database and subscriber management subsystem 450 may be any suitable hardware and/or software configuration used to access this data. In one embodiment of the invention, subscriber management subsystem 450 may also comprise a management facade 454. Management facade 454 may be, for example, any suitable software and/or hardware configuration that enables consistent delivery of services across a product suite. In one embodiment of the invention, management facade 454 is configured to provide a uniform appearance and defined methodology to any entity wishing to integrate with the subscriber management subsystem 450.

Communication subsystem 400 may include a hardware element 415. This element may be, for example a switch that interfaces the service management subsystem 240 with a PSTN 420. Hardware element 415 may operate under the control of an external host program 425. Under the control of host program 425, the switch 415 may route incoming data calls to one or more modems 435. These modems may interface with one or more vehicle communications components 445. When directed to do so, hardware element 415 may reroute calls to appropriate channels in the VUI subsystem 405. In one embodiment of the invention, the interface between the PSTN 420 and the switch 415 is a set of engineered telecommunication facilities, such as, for example, ISDN T-1 lines, each of which can support multiple independent conversations. In one embodiment of the invention, hardware element 415 also communicates with VUI subsystem 405 using similar facilities.

The vehicle communication (Veh/Comm) component 445 of subsystem 400 is any suitable hardware or software configuration that serves to validate and coordinate handling of incoming calls. Veh/Comm component 445 may also retrieve associated subscriber information, and set up the telephony sessions between the subscriber and VUI Subsystem 405. In one embodiment of the invention, when a subscriber connects to the service management system 240 from a vehicle, the vehicle sends a data message containing an identifier, which is unique to the vehicle. This data message may be routed to Veh/Comm component 445 by the hardware component 415. For example, the message may be routed through a modem 435. Veh/Comm component 445 may send the unique identifier to subscriber management system 450 to retrieve associated subscriber information. Veh/Comm component 445 may then verify the connection using a challenge/response protocol with the vehicle. If the subscriber's information is retrieved successfully and the connection verified, Veh/Comm component 445 may send a command to the vehicle to switch to voice mode. It may also send a command to the host program 425, which controls the switch 415, to reattach the call to the VUI Subsystem 405. In the command sent to the host program, Veh/Comm component 445 may direct the host program and the switch 415 to attach a User-to-User Information (UUI) packet. In one embodiment of the invention, the UUI packet contains a session identifier, the current GMT offset for the vehicle, a flag indicating whether the user should be asked for a PIN and, if not, a Subscriber ID. The UUI packet may be routed to the VUI subsystem 405 that handles the call. The UUI packet may also be used to set up the user session. Veh/Comm component 445 may halve IP connections with the modems 435 and the host program 425. Vehicle communication component 445 may also access the service management system 240 via an engineering data communication facility.

Host program 425 of subsystem 400 is any suitable program for managing components of subsystem 400. For example, host program 425 may serve to control the hardware component 415, which may be a switch. During subscriber connection sequences, host program 425 may direct initial call messages to modems 435. Host program may also interface the switch 415 with vehicle communication component 445. Host program 425 may also receive commands from Veh/comm component 445 to reattach incoming calls to VUI Subsystem 405. Host program 425 may forward these commands to the switch 415, and may include UUI attachments from Veh/Comm component 445 which are intended to be forwarded to VUI subsystem 405.

Figure 5:
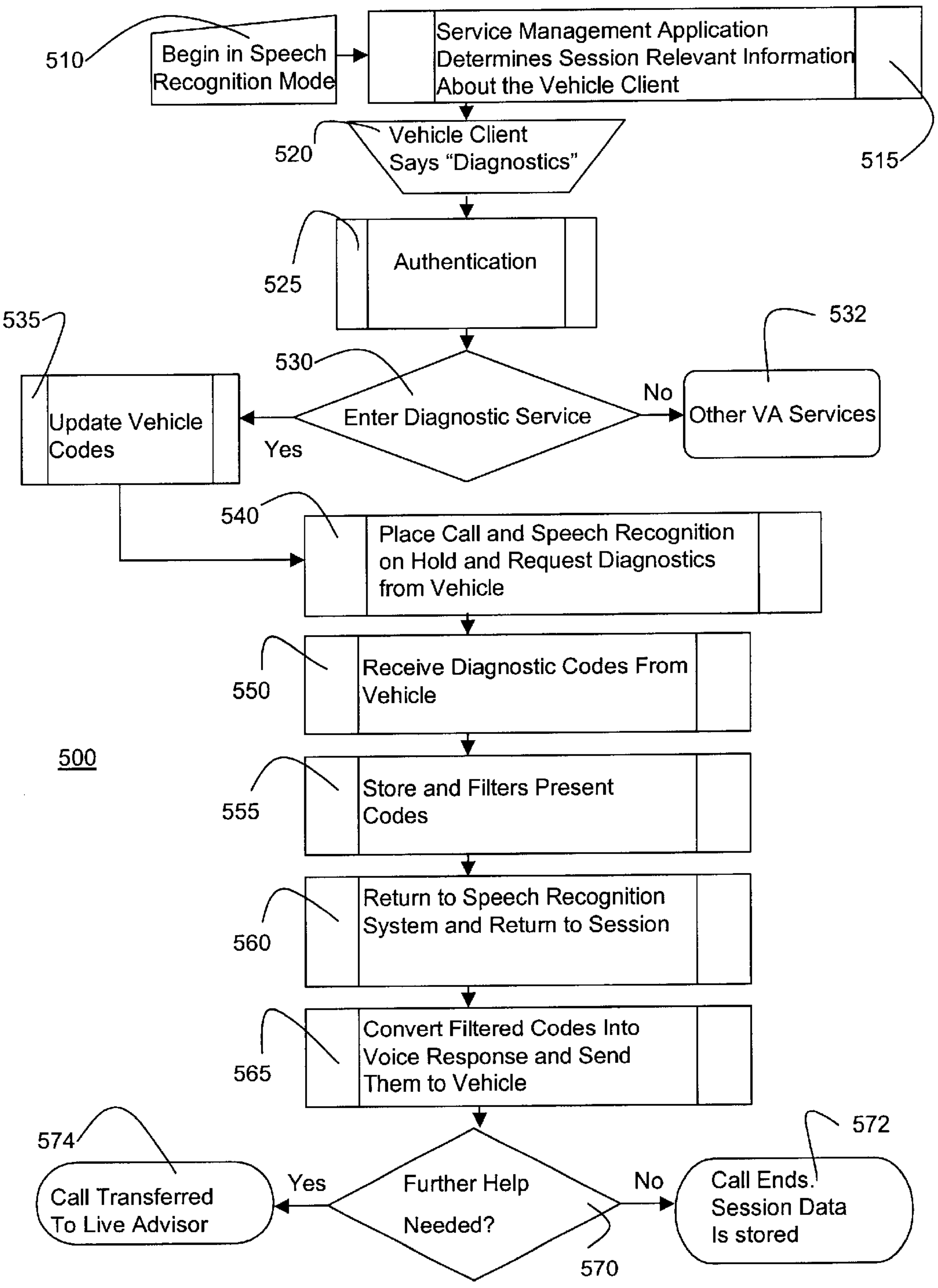
FIG. 5 is a flow diagram of one embodiment of a method for providing automated voice response to deliver remote vehicle diagnostic service.

FIG. 5 shows a flow diagram of one embodiment of a method for providing automated voice response to deliver remote vehicle diagnostic service to a vehicle in accordance with the present invention at 500.

At 510, a vehicle client begins the session in speech recognition mode. Vehicle client may be, for example, a vehicle as described above or an occupant of the vehicle. The speech recognition mode may be a mode where human speech characteristics are associated with preset computer code.

At 515 the service management application may determine information about the vehicle client. In one embodiment of the invention, this information is relevant to the current session between the vehicle client and the service management application. For example, service management application may determine a geographic location of the vehicle.

In one embodiment of the invention, the information determined at 515 may be sent to the vehicle client. This may be done, for example, for purposes of confirmation.

At 520, the vehicle client may send a request for a remote diagnostics service. In one embodiment vehicle client may say the word "diagnostics" or another word associated with a "check diagnostic code" request. This request may be a request from the vehicle to the service management application to retrieve any present vehicle diagnostic codes at the vehicle and filter these codes. This request is then forwarded to a service management application. The request may be forwarded, for example, via one or more of the interfaces described above, such as a communication network or a PSTN carrier network.

At 525, the service management application authenticates the vehicle client. In one embodiment of the invention, the service management application may check the vehicle identifier as described above. The authentication process may be done to verify that the correct vehicle client is using the service.

If the vehicle client is authenticated, then at block 530 the speech recognition software may determine whether the voice command at block 520 corresponds to a command to enter diagnostic service. In one embodiment this may be the "check diagnostic code" command at the service management application, associated with the diagnostic request from the vehicle.

At block 530, the service management application may determine that the vehicle client desires the diagnostic service and consequently may enter the diagnostic service. The application may then access a diagnostic code database containing diagnostic codes. In one embodiment, the diagnostic codes may include preset voice responses associated with them. These voice responses may contain information such as a detailed explanation of what the code means, the severity of the code, i.e. how dangerous the problem may be, and the steps to take to remedy the condition associated with the code.

Alternatively, at block 532, service management application may determine that the vehicle client desires a service other than a diagnostic evaluation and asks the vehicle client what service he would like to enter. Alternatively, the service management application may connect the vehicle client to a live representative to address any further inquiries.

If the service application determines at 530 to enter diagnostic service, then at block 535 the service management application may check whether the codes at the vehicle are fully up to date. In one embodiment, this may be done by comparing all the codes corresponding to the vehicle at the service management application to the codes at an in-vehicle code database. Alternatively, this may be done by storing vehicle diagnostic codes in a vehicle user profile. New vehicle diagnostic codes may be developed at the service management application. If the service management application determines that new codes are available, the new vehicle diagnostic codes may be sent to the vehicle. They may then be installed at the vehicle by an in-vehicle communication component at an in-vehicle diagnostic computer. Otherwise no new vehicle diagnostic codes are sent to the vehicle.

At block 540, the service management application may place the call and speech recognition session on hold. The session may then be transferred to a modem pool. The channel of communication may then be switched to a data transfer channel. The service management application may then send a command requesting diagnostic codes from the vehicle.

At block 550, the service management application may receive any diagnostic codes present at the vehicle. These codes may be any codes that have been set off by a condition at the vehicle. This may occur by a malfunction of one of the vehicle's systems, or a warning at the vehicle. One example of a condition may be a "low engine coolant" warning at the vehicle. When the engine coolant reaches a low level, it may set off a warning, which is converted to a diagnostic code at the vehicle. Another condition may be an internal fuel leakage. Another condition may be an engine failure. Many different conditions may occur each having a vehicle diagnostic code associated with them. If no vehicle diagnostic codes are present at the vehicle, then no codes are received by the service management application. If no code is present at the vehicle, the service management application may subsequently send a message to the vehicle "that no help can be given at this time" and may transfer the vehicle client to a live advisor.

At block 555, the service management application may filter the present diagnostic codes and store these codes. In one embodiment, the service management application may filter the present diagnostic code based on at least one usability factor. The usability factor may be based on a pre-determined severity rating, vehicle code complexity, and user location. The severity rating may rate the diagnostic codes on a scale of, for example, light, medium, high, or extreme severity. Alternatively, for example, the severity rating may be on a scale of "not necessary to see dealer", "see dealer within a week", "see dealer within a month", "stay where you are and a tow truck will be sent to assist you". The vehicle code complexity may be based on how complex the code may be and whether an average vehicle client may be able to do anything to remedy such a complex condition associated with the code without professional help. The vehicle location may specify a GPS coordinate position of the vehicle client. The usability factor may also be determined on the proximity of the nearest service station to the user's GPS positioning. The present codes may then be stored on a remote server for further use.

At block 560, the service management application may return the channel to voice mode and return to the session. Voice contact may then be again established between the service management application and the vehicle client.

At block 565, the service management application converts the filtered diagnostic codes into the associated voice response on the accessed diagnostic code database. In one embodiment the service management application may then play the actual diagnostic code with the associated voice response to the vehicle through a voice channel. In another embodiment the service management application may send the actual diagnostic code with the associated voice response to the vehicle through a data channel, and the data may then be converted into an audible response by the vehicle. If no codes are present at the vehicle, the service management application may play a preset response, "no vehicle diagnostic codes detected".

At block 570, the service management application may conduct a service satisfaction inquiry. The service management application may ask the vehicle client whether "further assistance is needed". In one embodiment the channel between the vehicle client and the service management application may be in speech recognition mode.

If the vehicle client is satisfied with the diagnostic code explanation, then at block 572, the call may be ended and the connection between the vehicle client and the service management application may be terminated. In one embodiment of the invention, as further seen at block 572, information gathered during the session may be processed by the service management application. For example, once a session is complete, data gathered during the session may be stored by the application. Alternatively, data gathered during the session may be used to update the vehicle client profile. Alternatively, the data may be used for evaluation purposes.

If the vehicle client is unsatisfied with the diagnostic code description, has further questions, or needs further assistance, then at block 574, the call is transferred to a live advisor. The live advisor may view both the filtered and unfiltered diagnostic codes and assist the vehicle client further. Based on the vehicle client location the live advisor can recommend the nearest service stations to assist the user. After the call with the live advisor is ended the session-relevant information may be processed (as shown at block 572).

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method of remotely diagnosing a vehicle comprising:

receiving a vehicle diagnostic request;

retrieving at least one diagnostic code from the vehicle;

filtering the at least one diagnostic code based on at least one usability factor; and sending a preset diagnostic response associated with the filtered diagnostic code to the vehicle.

2. The method of claim 1 wherein the preset diagnostic response is an associated voice response.

3. The method of claim 1 further comprising:

determining the usability factor based on a user location, a vehicle code complexity, and a severity factor.

4. The method of claim 1 wherein receiving the vehicle diagnostic request comprises receiving a voice request at a service management application, the voice request being associated by a speech recognition system to a check diagnostic command.

5. The method of claim 1, further comprising:

authenticating the vehicle diagnostic request.

6. The method of claim 1, further comprising:

storing the at least one vehicle diagnostic code at a service management application on a remote server.

7. The method of claim 1, further comprising:

transferring to a live representative in response to a user reply to a satisfaction inquiry.

8. The method of claim 1, further comprising:

updating vehicle diagnostic codes.

9. The method of claim 8 wherein updating the vehicle diagnostic codes comprises downloading the vehicle diagnostic codes to an in-vehicle diagnostic computer.

10. A system for remotely diagnosing a vehicle comprising:

means for receiving a vehicle diagnostic request;

means for retrieving at least one diagnostic code from the vehicle;

means for filtering the at least one diagnostic code based on at least one usability factor; and means for sending a preset diagnosis response associated with the filtered diagnostic code to the vehicle.

11. The system of claim 10 further comprising:

means for determining the usability factor based on a user location, a vehicle code complexity, and a severity factor.

12. The system of claim 10 further comprising:

means for authenticating the vehicle diagnostic request.

13. The system of claim 10 further comprising:

means for storing the at least one vehicle diagnostic code at a service management application on a remote server.

14. The system of claim 10 further comprising:

means for transferring to a live representative in response to a user reply to a satisfaction inquiry.

15. The system of claim 10 further comprising:

means for updating vehicle diagnostic codes.

16. A computer usable medium including a program for remotely diagnosing a vehicle comprising:

computer readable program code that receives a vehicle diagnostic request;

computer readable program code that retrieves at least one diagnostic code from the vehicle;

computer readable program code that filters at least one diagnostic code based on at least one usability factor; and computer readable program code that sends a preset diagnostic voice response associated with the filtered diagnostic code to the vehicle.

17. The medium of claim 16 wherein the preset diagnostic response is an associated voice response.

18. The medium of claim 16 further comprising:

computer readable program code that determines the usability factor based on a user location, a vehicle code complexity, and a severity factor.

19. The medium of claim 16 wherein the vehicle diagnostic request comprises computer readable program code that receives a voice request at a service management application, the voice request being associated by a speech recognition system to a check diagnostic command.

20. The medium of claim 16 further comprising:

computer readable program code that authenticates the vehicle diagnostic request.

21. The medium of claim 16 further comprising:

computer readable program code that stores the at least one vehicle diagnostic code at a service management application on a remote server.

22. The medium of claim 16 further comprising:

computer readable program code that transfers to a live representative in response to a user reply to a satisfaction inquiry.

23. The medium of claim 16 further comprising:

computer readable program code that updates the vehicle diagnostic codes.

24. The medium of claim 23 wherein updating the vehicle diagnostic codes comprises downloading the vehicle diagnostic codes to an in-vehicle diagnostic computer.

* * * * *